United States Patent
He (10) Patent No.: US 10,986,377 B2
(45) Date of Patent: Apr. 20, 2021

(54) METHOD AND DEVICE FOR SENDING ACCESS TO RECOMMENDED INFORMATION IN LIVE STREAMING

(71) Applicant: ADVANCED NEW TECHNOLOGIES CO., LTD., Grand Cayman (KY)

(72) Inventor: Sanyuan He, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 25 days.

(21) Appl. No.: 16/363,877

(22) Filed: Mar. 25, 2019

(65) Prior Publication Data

US 2019/0222868 A1 Jul. 18, 2019

Related U.S. Application Data

(63) Continuation of application No. PCT/CN2017/102387, filed on Sep. 20, 2017.

(30) Foreign Application Priority Data

Sep. 27, 2016 (CN) .......................... 201610857536.4

(51) Int. Cl.
*H04N 21/2187* (2011.01)
*G06F 16/957* (2019.01)
(Continued)

(52) U.S. Cl.
CPC ......... *H04N 21/2187* (2013.01); *G06F 9/451* (2018.02); *G06F 16/957* (2019.01);
(Continued)

(58) Field of Classification Search
CPC ........... H04N 21/2187; H04N 21/4788; H04N 21/44222; H04N 61/6402; G06F 16/957;
(Continued)

(56) References Cited

U.S. PATENT DOCUMENTS 5,774,666 A * 6/1998 Portuesi ................. H04N 7/088
725/110
6,175,840 B1 * 1/2001 Chen .................... H04N 21/235
715/210

(Continued)

FOREIGN PATENT DOCUMENTS

CN 102802055 A 11/2012
CN 103297840 A 9/2013
(Continued)

OTHER PUBLICATIONS

Decision on Grant for Russian Application No. 2019112880 dated Apr. 21, 2020.

(Continued)

*Primary Examiner* — Daniel C. Murray (57) ABSTRACT

A method for pushing information in live streaming is provided. With this method, a live streaming terminal may send a push information identifier to a live streaming server in a live streaming process. The live streaming server may determine an access address of push information based on the push information identifier, and send the access address to a play terminal. The play terminal can present the push information to a play terminal user, and allows the play terminal user to trigger the access address. When the play terminal user triggers the access address, the play terminal can access a web page corresponding to the push information. As such, an access address of push information published by a live streaming terminal user can be accessed on an interface of a play terminal, and a user of the play terminal can obtain the push information by clicking the access address.

15 Claims, 4 Drawing Sheets

(51) Int. Cl.
*G06Q 30/02* (2012.01)
*H04N 21/4788* (2011.01)
*G06F 16/9535* (2019.01)
*G06F 9/451* (2018.01)
*H04L 29/08* (2006.01)
*H04N 21/442* (2011.01)
*H04N 21/6402* (2011.01)

(52) U.S. Cl.
CPC ..... *G06F 16/9535* (2019.01); *G06Q 30/0277* (2013.01); *H04L 67/26* (2013.01); *H04N 21/44222* (2013.01); *H04N 21/4788* (2013.01); *H04N 21/6402* (2013.01)

(58) Field of Classification Search
CPC .... G06F 16/9535; G06F 9/451; G06F 16/958; G06F 16/955; G06Q 30/0277; H04L 67/26
See application file for complete search history.

(56) References Cited

U.S. PATENT DOCUMENTS

| | | | |
|---|---|---|---|
| 6,351,761 B1 | 2/2002 | Cantone et al. | |
| 6,385,592 B1* | 5/2002 | Angles | G06Q 30/02 705/14.56 |
| 6,714,215 B1* | 3/2004 | Flora | G06F 16/40 715/716 |
| 6,850,901 B1* | 2/2005 | Hunter | G06Q 20/04 705/26.35 |
| 7,000,242 B1* | 2/2006 | Haber | G06Q 30/02 725/43 |
| 7,620,914 B2* | 11/2009 | Li | H04N 5/445 715/854 |
| 7,899,705 B2* | 3/2011 | Fuisz | G06F 16/951 705/14.55 |
| 8,001,116 B2* | 8/2011 | Cope | G06Q 30/02 707/724 |
| 8,112,311 B2* | 2/2012 | Hunter | G06Q 30/0255 705/14.71 |
| 8,296,185 B2* | 10/2012 | Isaac | H04N 21/8586 705/14.55 |
| 8,312,486 B1* | 11/2012 | Briggs | H04N 21/8455 725/32 |
| 8,384,743 B2* | 2/2013 | Gorti | H04N 21/4725 345/635 |
| 8,479,246 B2* | 7/2013 | Hudson | H04N 21/8541 725/113 |
| 8,683,068 B2* | 3/2014 | Jalili | H04L 12/40117 709/231 |
| 8,725,582 B2* | 5/2014 | Agnihotri | H04N 21/47815 705/26.1 |
| 8,775,938 B2* | 7/2014 | Rosser | G06F 16/9535 715/730 |
| 8,832,747 B2* | 9/2014 | Karaoguz | H04N 21/4725 725/60 |
| 9,015,745 B2* | 4/2015 | Sinha | H04N 21/25866 725/23 |
| 9,118,958 B2* | 8/2015 | Reichardt | H04N 21/4821 |
| 9,141,258 B2* | 9/2015 | Sundstrom | G06F 3/04812 |
| 9,185,179 B2* | 11/2015 | Qureshi | H04L 67/26 |
| 9,208,500 B2* | 12/2015 | Brown | G06Q 30/0241 |
| 9,332,302 B2* | 5/2016 | Briggs | H04N 21/435 |
| 9,343,112 B2* | 5/2016 | Amidei | G11B 27/11 |
| 9,360,985 B2* | 6/2016 | Sundstrom | G06F 16/748 |
| 9,390,425 B2* | 7/2016 | de Heer | H04N 21/4331 |
| 9,516,251 B2* | 12/2016 | Welch | H04N 21/2542 |
| 9,538,209 B1* | 1/2017 | Kokenos | H04N 21/4316 |
| 9,571,900 B2* | 2/2017 | Slothouber | H04N 21/6582 |
| 9,865,017 B2* | 1/2018 | Huber | G06Q 30/08 |
| 9,875,489 B2* | 1/2018 | Spitz | G06Q 30/0277 |
| 9,888,289 B2* | 2/2018 | Gross | H04N 21/4725 |
| 9,990,655 B2* | 6/2018 | MacTiernan | G06Q 30/0269 |
| 10,051,298 B2* | 8/2018 | Bear | G11B 27/105 |
| 10,055,768 B2* | 8/2018 | Briggs | G06Q 30/0277 |
| 10,057,310 B1* | 8/2018 | Grunewald | H04N 21/4622 |
| 10,219,015 B2* | 2/2019 | Kokenos | G06Q 30/06 |
| 10,268,994 B2* | 4/2019 | Spitz | G06Q 30/0277 |
| 10,326,822 B2* | 6/2019 | Reichling | G06F 3/0486 |
| 10,354,633 B2* | 7/2019 | O'Driscoll | G06F 3/0484 |
| 10,827,204 B2* | 11/2020 | Lan | H04N 21/2541 |
| 2002/0080163 A1* | 6/2002 | Morey | H04N 21/4782 715/727 |
| 2002/0120934 A1* | 8/2002 | Abrahams | G06Q 30/06 725/60 |
| 2005/0022226 A1* | 1/2005 | Ackley | H04N 21/4725 725/23 |
| 2005/0086690 A1* | 4/2005 | Gilfix | H04N 21/435 725/42 |
| 2005/0235324 A1* | 10/2005 | Makipaa | H04N 19/20 725/60 |
| 2006/0117365 A1* | 6/2006 | Ueda | H04N 21/25866 725/112 |
| 2006/0129908 A1* | 6/2006 | Markel | H04L 29/06027 715/202 |
| 2006/0230123 A1* | 10/2006 | Simmons | G06Q 30/0603 709/219 |
| 2007/0150360 A1* | 6/2007 | Getz | G06Q 30/0641 705/27.1 |
| 2007/0180037 A1* | 8/2007 | Cheng | H04L 67/26 709/206 |
| 2007/0250194 A1* | 10/2007 | Rhoads | G06Q 30/02 700/94 |
| 2007/0250848 A1* | 10/2007 | Gorti | H04N 21/6175 725/14 |
| 2008/0098425 A1* | 4/2008 | Welch | H04N 21/2542 725/37 |
| 2008/0163283 A1* | 7/2008 | Tan | H04N 21/234318 725/20 |
| 2009/0018929 A1* | 1/2009 | Weathers, Jr. | G06Q 30/02 705/26.8 |
| 2009/0276807 A1* | 11/2009 | Robotham | G06Q 30/02 725/40 |
| 2009/0281907 A1* | 11/2009 | Skog | H04L 65/608 705/26.1 |
| 2010/0153848 A1* | 6/2010 | Saha | G06F 16/9562 715/721 |
| 2011/0262103 A1 | 10/2011 | Ramachandran et al. | |
| 2012/0072420 A1* | 3/2012 | Moganti | G06F 16/748 707/737 |
| 2012/0116883 A1* | 5/2012 | Asam | G06Q 30/0251 705/14.58 |
| 2012/0124618 A1* | 5/2012 | Ruiz-Velasco | G06Q 30/0241 725/32 |
| 2012/0304065 A1* | 11/2012 | Cai | G06F 16/748 715/719 |
| 2012/0310750 A1* | 12/2012 | Schutzbank | G06Q 30/02 705/14.72 |
| 2013/0027613 A1* | 1/2013 | Kim | H04N 21/4788 348/563 |
| 2013/0268354 A1* | 10/2013 | Jayaram | G06Q 30/0275 705/14.49 |
| 2013/0290149 A1* | 10/2013 | Rashwan | G06Q 30/0641 705/27.1 |
| 2014/0002550 A1 | 1/2014 | Ito et al. | |
| 2014/0149877 A1* | 5/2014 | Wang | H04L 67/26 715/738 |
| 2015/0120462 A1* | 4/2015 | Zhang | G06Q 20/3276 705/14.64 |
| 2015/0289022 A1* | 10/2015 | Gross | H04N 21/482 725/51 |
| 2016/0063593 A1* | 3/2016 | Li | G06Q 30/0629 705/26.64 |
| 2016/0100332 A1* | 4/2016 | Yi | H04W 4/12 370/338 |
| 2016/0205431 A1* | 7/2016 | Avedissian | H04N 21/8456 725/37 |
| 2016/0210665 A1* | 7/2016 | Champy | G06Q 30/0241 |
| 2016/0286244 A1* | 9/2016 | Chang | H04N 21/26603 |

(56) References Cited

U.S. PATENT DOCUMENTS

| | | | |
|---|---|---|---|
| 2017/0018002 A1* | 1/2017 | Champy | H04N 21/41407 |
| 2017/0187986 A1* | 6/2017 | Zhang | H04N 21/2187 |
| 2017/0195744 A1* | 7/2017 | Engel | H04N 21/4825 |
| 2017/0244779 A1* | 8/2017 | Reichling | G06F 9/451 |
| 2018/0288450 A1* | 10/2018 | Zuo | H04N 21/23424 |
| 2019/0037254 A1* | 1/2019 | Fennelly | G06Q 20/12 |
| 2019/0052925 A1* | 2/2019 | McDowell | G06Q 30/0277 |
| 2019/0182562 A1* | 6/2019 | Peng | H04N 21/8146 |
| 2019/0200047 A1* | 6/2019 | Cui | H04N 21/47202 |
| 2019/0238908 A1* | 8/2019 | Lu | H04L 29/06 |
| 2019/0364329 A1* | 11/2019 | Isaac | G11B 27/11 |

FOREIGN PATENT DOCUMENTS

| | | |
|---|---|---|
| CN | 104080007 A | 10/2014 |
| CN | 104394126 A | 3/2015 |
| CN | 105635764 A | 6/2016 |
| CN | 105828123 A | 8/2016 |
| CN | 105828124 A | 8/2016 |
| CN | 105847896 A | 8/2016 |
| CN | 105872839 A | 8/2016 |
| CN | 105916048 A | 8/2016 |
| CN | 106412667 A | 2/2017 |
| CN | 106453617 A | 2/2017 |
| CN | 106991108 A | 7/2017 |
| JP | 2010-098730 A | 4/2010 |
| JP | 5795163 B2 | 10/2015 |
| JP | 6041326 B2 | 12/2016 |
| RU | 2339185 C1 | 11/2008 |
| TW | M456551 U | 7/2013 |
| TW | 201610889 A | 3/2016 |
| WO | 2009/145948 A1 | 12/2009 |

OTHER PUBLICATIONS

Search Report for European Application No. 17854735.2 dated Mar. 26, 2020.
Examination Report No. 2 for Australian Patent Application No. 2017333190 dated Mar. 31, 2020.
Office Action for Japanese Application No. 2019-516625 dated Apr. 21, 2020.
Second Office Action for Chinese Application No. dated Apr. 9, 2020.
Office Action for Russian Application No. 2019112880 dated Dec. 26, 2019 (8 pages).
Office Action for Canadian Application No. 3038230 dated Mar. 5, 2020 (6 pages).
Examination Report No. 1 for Australian Patent Application No. 2017333190 dated Jan. 15, 2020 (3 pages).
Search Report for Russian Application No. 2019112880 dated Dec. 26, 2019 (4 pages).
Decision to reject for Taiwanese Application No. 106124624 dated May 30, 2019 (4 pages).
First Search for Chinese Application No. 201610857536.4 dated Oct. 22, 2019 (1 page).
First Office Action for Chinese Application No. 201610857536.4 dated Oct. 30, 2019 with English machine translation (30 pages).
International Preliminary Report on Patentability Chapter I for PCT Application No. PCT/CN2017/102387 dated Apr. 11, 2019 (12 pages).
Written Opinion of the International Searching Authority and International Search Report for PCT Application No. PCT/CN2017/102387 dated Dec. 27, 2017 (15 pages).
Office Action for Taiwanese Application No. 106124624 dated Feb. 20, 2019 (13 pages).
Office Action for Korean Application No. 10-2019-7011926 dated Oct. 21, 2020.

* cited by examiner

METHOD AND DEVICE FOR SENDING ACCESS TO RECOMMENDED INFORMATION IN LIVE STREAMING

CROSS-REFERENCE TO RELATED APPLICATIONS

The present application is a continuation application of International Application No. PCT/CN2017/102387, filed on Sep. 20, 2017, which claims the benefit of the Chinese Patent Application No. 201610857536.4 filed with the State Intellectual Property Office (SIPO) of the People's Republic China on Sep. 27, 2016. The entire contents of the above-identified applications are incorporated herein by reference.

TECHNICAL FIELD

This application relates to the field of information technologies, and in particular, to an information push method and device.

BACKGROUND

In the Internet era, watching anchors' live streaming through a live streaming platform, has become a new routine of mass entertainment. Many anchors present and recommend some valuable information or useful products to play terminal users through live streaming, for example, pretty clothes, interesting novels, funny microblogs, and durable electric appliances.

However, existing live streaming platforms cannot support the play terminal users in directly accessing, during watching the live streaming, a web page on which the recommended information is located. The play terminal users need to record a feature of the recommended information, and then search for the information on the network or offline, which takes time and efforts. In addition, because a live streaming video cannot be played back, the play terminal users often cannot accurately record the feature of the recommended information, which makes the information obtained by the play terminal users often inconsistent with the recommended information. The information push method in the existing technologies is relatively inconvenient for the play terminal users.

SUMMARY

Embodiments of this specification provide an information push method and device, to resolve a problem that an existing information push method is relatively inconvenient for a play terminal user.

In one aspect, an embodiment of this specification provides an information push method. The method includes receiving, by a live streaming server in a live streaming process, a push information identifier from a live streaming terminal; determining an access address of the push information based on the push information identifier; and pushing the access address to a play terminal for presentation. When the play terminal detects that the access address is triggered, for example, by a play terminal user, the play terminal accesses a web page corresponding to the push information.

In another aspect, an embodiment of this specification provides another information push method. The method includes receiving, by a live streaming terminal in a live streaming process, a push information identifier from, for example, a live streaming terminal user; and sending the push information identifier to a live streaming server to determine an access address of the push information based on the push information identifier. The access address is for accessing a web page corresponding to the push information when the access address is triggered, for example, by a play terminal user.

In another aspect, an embodiment of this specification provides another information push method. The method includes: receiving, by a play terminal in a live streaming process, an access address of push information from a live streaming server; presenting the received access address; and accessing a web page corresponding to the push information, when the play terminal detects that the access address is triggered by a play terminal user.

In another aspect, an embodiment of this specification provides another information push method. The method includes: receiving, by a live streaming terminal in a live streaming process, a product identifier input by a live streaming terminal user; and sending the product identifier to a live streaming server, for the live streaming server to determine a purchase address of a product based on the product identifier, and push the purchase address to a play terminal for presentation, for the play terminal to access, when detecting that the purchase address is triggered by a play terminal user, a web page corresponding to the purchase address.

In another aspect, an embodiment of this specification provides another information push method. The method includes: receiving, by a live streaming server in a live streaming process, a product identifier sent by a live streaming terminal; determining a purchase address of a product based on the product identifier; and pushing the purchase address to a play terminal for presentation, for the play terminal to access, when detecting that the purchase address is triggered by a play terminal user, a web page corresponding to the purchase address.

In another aspect, an embodiment of this specification provides another information push method. The method includes: receiving, by a play terminal in a live streaming process, a purchase address of a product that is sent by a live streaming server; presenting the received purchase address; and accessing, when detecting that the purchase address is triggered by a play terminal user, a web page corresponding to the purchase address.

In another aspect, an embodiment of this specification provides an information push device. The device includes: a receiving module, configured to receive, in a live streaming process, a push information identifier input by a live streaming terminal user; and a sending module configured to send the push information identifier to a live streaming server, for the live streaming server to determine an access address of push information based on the push information identifier, and push the access address to a play terminal for presentation, for the play terminal to access, when detecting that the access address is triggered by a play terminal user, a web page corresponding to the access address.

In another aspect, an embodiment of this specification provides another information push device. The device includes: a receiving module, configured to receive, in a live streaming process, a push information identifier sent by a live streaming terminal; a determining module, configured to determine an access address of push information based on the push information identifier; and a push module, configured to push the access address to a play terminal for presentation, for the play terminal to access, when detecting that the access address is triggered by a play terminal user, a web page corresponding to the access address.

In another aspect, an embodiment of this specification provides another information push device. The device includes: a receiving module, configured to receive, in a live streaming process, an access address of push information that is sent by a live streaming server; a presentation module, configured to present the received access address; and an access module, configured to access, when detecting that the access address is triggered by a play terminal user, a web page corresponding to the access address.

At least one of the foregoing technical solutions used in the embodiments of this specification can achieve the following beneficial effects: an access address of push information published by a live streaming terminal user can be accessed on an interface of a play terminal, and the play terminal user can directly obtain the push information by clicking the access address, thereby improving convenience of obtaining the push information by the play terminal user.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the accompanying drawings.

DETAILED DESCRIPTION OF THE INVENTION

To make the objectives, technical solutions, and advantages of this application clearer, the following clearly and completely describes the technical solutions of this application with reference to specific embodiments of this application and the corresponding accompanying drawings. Apparently, the described embodiments are only some embodiments rather than all the embodiments of this application. All other embodiments obtained by a person of ordinary skill in the art based on the embodiments of this application without creative efforts shall fall within the protection scope of this application.

The following describes the technical solutions provided in the embodiments of this specification in detail with reference to the accompanying drawings.

Figure 1:
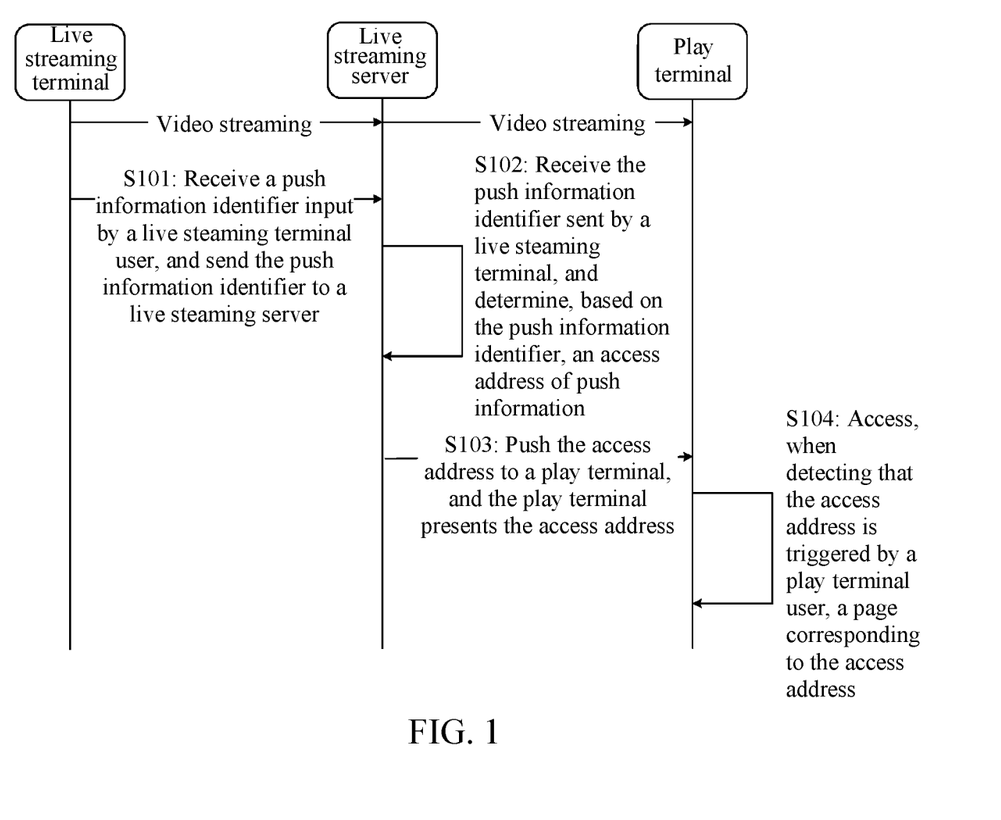
FIG. 1 is a flowchart of an information push method according to an embodiment of this specification.

FIG. 1 is a flowchart of an information push method according to an embodiment of this specification. The method includes the following steps.

S101: In a live streaming process, a live streaming terminal receives a push information identifier input by a live streaming terminal user, and sends the push information identifier to a live streaming server.

An application scenario in this invention is that in the network live streaming process, the live streaming terminal user initiates information push by using network live streaming software (referred to as live streaming terminal software below) installed on a live streaming terminal device, so that a play terminal user can directly obtain the push information.

For example, in some embodiments, the live streaming terminal device may be a mobile phone, a tablet computer, or a personal computer. Any device on which the network live streaming software can be installed and that can implement network communications so that the live streaming terminal user initiates information push may be an implementation body of the method.

In other embodiments, the push information may be a novel, news, an interesting image, a useful website, application, or product that the live streaming terminal user intends to push to the play terminal user, and the play terminal user may obtain the push information on the network based on the push of the live streaming terminal user. That is, any information that can be obtained by the play terminal user by using the network may be the push information of the method.

In one embodiment of this specification, the push information identifier may be an access address of the push information or a label of the push information. The access address is an access address corresponding to a web page on which the push information is located. The access address may be a uniform resource locator (URL) address, or may be a hyperlink such as an image link or a text link. When the access address is the image link, image content may be a summary of the push information or a product view related to the push information. When the access address is the text link, text content may be a summary, a theme, or the like of the push information. In short, the access address only needs to have an association with the web page on which the push information is located. This application does not limit a specific form of the access address.

In addition, the label of the push information is a label corresponding to an access address of push information. The push information may be stored in the live streaming server, the live streaming terminal, or a third party server.

In one application scenario, that the live streaming terminal user pushes the information to the play terminal user usually includes two cases: first, the live streaming server (which may alternatively be the live streaming terminal or the third party server) has stored several push information identifiers (access addresses); and second, the access address of the push information needs to be provided by the live streaming terminal user.

In the foregoing first case, take the live streaming server storing the several push information identifiers as an example. The live streaming terminal software downloads, according to a received push information presentation instruction sent by the user, an access address list of the push information or a label list of the push information from the live streaming server and presents the access address list or the label list. The live streaming terminal user may directly select, from the list, an access address or label of the push information that the user intends to push, or may input key words in a search field provided by the live streaming terminal software, then select the access address or the label of the push information from the search-result list, and use the selected access address or label as the push information identifier and then send the push information identifier to the live streaming server.

When the live streaming terminal user selects the label of the push information from the list, the live streaming terminal uses the selected label as the push information identifier and then sends the push information identifier to the live streaming server. After determining, based on the label, an access address of the corresponding push information, the live streaming server pushes the access address to a play terminal.

Further, when the label selected by the live streaming terminal user corresponds to more than one access address in the live streaming server, the live streaming server returns the determined one or more access addresses to the live streaming terminal, and the live streaming terminal presents the one or more access addresses for the live streaming terminal user to choose. Then the live streaming terminal uses an access address selected by the live streaming terminal user as the push information identifier and then sends the push information identifier to the live streaming server, and the live streaming server pushes the access address of the push information to the play terminal.

In the foregoing first case, the access address of the push information may alternatively be stored locally (that is, the live streaming terminal) or in the third party server. In this case, the foregoing access address list or the label list is correspondingly loaded and presented by the live streaming terminal according to the push information presentation instruction sent by the live streaming terminal user, or is downloaded or presented by the live streaming terminal from the third party server according to the push information presentation instruction. The access address or label selected by the live streaming terminal user from the list may need to be sent by the live streaming terminal to the live streaming server, to serve as the push information identifier.

Similarly, when the label selected by the live streaming terminal user corresponds to more than one access address locally or in the third party server, the play terminal further displays the one or more access addresses corresponding to the label for selection or the third party server returns the one or more access addresses based on the received label.

In the foregoing second case, the live streaming terminal user may input an access address in an access address input area of the push information that is provided by the live streaming terminal software, the live streaming terminal uses the access address as the push information identifier and then sends the push information identifier to the live streaming server, and the live streaming server pushes the push information identifier to the play terminal.

S102: The live streaming server receives the push information identifier sent by the live streaming terminal, and determines, based on the push information identifier, an access address of push information.

In some embodiments, as described in the step S101, the push information identifier may be the access address or the label of the push information. When the push information identifier is the access address of the push information, the live streaming server may directly determine the received access address as the access address of the push information. The access address received by the live streaming server may alternatively be the access address previously selected by the live streaming terminal user from the one or more access addresses returned by the live streaming server based on the received label of the push information. When the push information identifier is the label of the push information, the live streaming server determines, based on the received label of the push information, an access address corresponding to the label.

S103: The live streaming server pushes the access address to a play terminal, and the play terminal presents the access address.

In some embodiments, as described in the step S101, the access address may be a URL address, or may be an image link or a text link. The play terminal may present the access address on a play area of a direct interface of the play terminal, provided that a size of a presentation area does not affect the play terminal user watching the live streaming. For example, the access address may be made to statically cover a part of the play area, or the access address may be enabled to dynamically float in the play area. In short, any access address presentation manner that facilitates the play terminal user to trigger the access address falls within the protection scope claimed by this application.

To facilitate the play terminal user to trigger the access address, the presentation manner of the access address is required to be independent of a presentation manner of a video frame. For example, generally, the play terminal user can switch between a full screen mode and a window mode by triggering the play area. If the access address and the video frame are combined, the play terminal may not be able to determine whether a trigger action of the user is to switch between the full screen mode and the window mode or to view the push information. Therefore, in an embodiment of this specification, the play terminal may establish, in a play area of a live streaming interface, a view layer independent of a live streaming view layer, and present the access address in the view layer.

Figure 2:
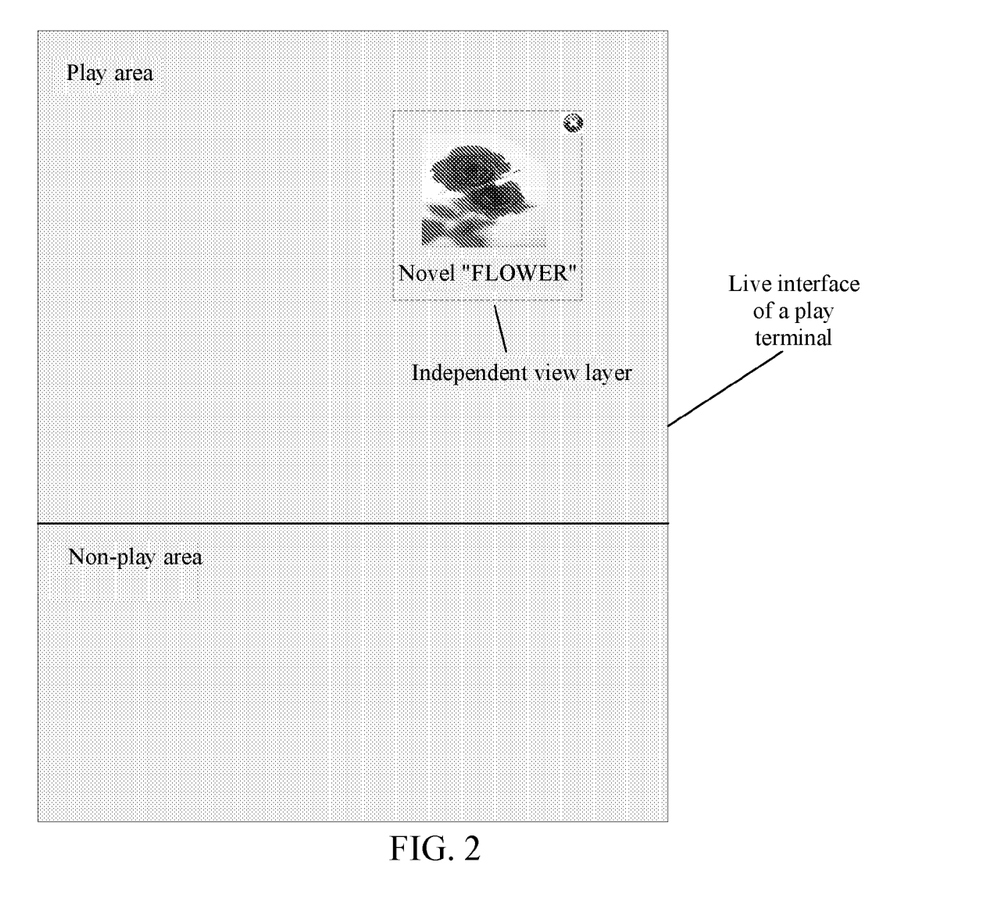
FIG. 2 is a schematic diagram of image link presentation of push information according to an embodiment of this specification.

FIG. 2 is a schematic diagram of image link presentation of push information according to an embodiment of this specification. As shown in FIG. 2, in an interface of the play terminal user, the image link is displayed on an independent view layer. Content of the image link is text "Novel "FLOWER"" and a view of a flower. This indicates that content of the push information is a novel named "FLOWER". In addition, a turn-off button is disposed on an upper right corner of the independent view layer. If the play terminal user is not interested in the push information, the play terminal user may turn off the push information.

S104: The play terminal accesses, when detecting that the access address is triggered by a play terminal user, a web page corresponding to the access address.

In some embodiments, the play terminal user may trigger the access address in a manner of a mouse single clicking, mouse double clicking, mouse right clicking, finger clicking, shaking a device, or the like, provided that the play terminal detects that the play terminal user intends to obtain the push information.

In other embodiments, a web page browsing function may be built in the network live streaming software of the play terminal, and the web page corresponding to the access address is directly loaded to the play terminal, or the web page corresponding to the access address may be loaded by invoking a third party browser.

In addition, in one application scenario, to collect statistics about promotion degrees of different anchors (that is, live streaming terminal users) for the push information, an access status of each piece of information pushed by each anchor needs to be recorded. The access record may indicate a total number of times that information, pushed by a certain anchor to the play terminal, is accessed by the play terminal users.

Therefore, in one embodiment of this specification, when detecting that the access address is triggered by a play terminal user, the play terminal determines a live streaming terminal user identifier corresponding to the live streaming process, and sends, to the live streaming server, an access notification including the live streaming terminal user identifier and the access address of push information, for the live streaming server to record an association between the live streaming terminal user identifier and the access address of the push information based on the live streaming terminal user identifier and the access address of the push information that are included in the received access notification.

For example, if a live streaming terminal user pushes information to a play terminal user in a live streaming process, once a play terminal detects that an access address of the push information is triggered once, the play terminal notifies a live streaming server, and the live streaming server adds one association record of a live streaming terminal user identifier and the push information. FIG. 2 is used as an example. A record before triggering this time is "Nana-Novel "FLOWER"-12". "Nana" is the live streaming terminal user identifier, "Novel "FLOWER"" is the image link of the push information, and "12" is a total number of times of accessing, by play terminal users watching a live streaming of Nana, a web page on which the novel is located after "Novel "FLOWER"" is pushed by "Nana". After a play terminal detects that the image link related to "Novel "FLOWER"" is triggered again, the play terminal sends an access notification to a live streaming server, and the live streaming server further changes the record as "Nana-Novel "FLOWER"-13", to be specific, adds one association record.

Further, when a push information identifier is stored in the third party server, the live streaming server may further send, to the third party server, an association record stored in the live streaming server and a live streaming platform identifier of the live streaming server, so that the third party server may obtain an association record stored in a live streaming platform.

According to the method shown in FIG. 1, the access address of the push information published by the live streaming terminal user is displayed on the interface of the play terminal user, and the play terminal user can directly obtain the push information by clicking the access address, thereby improving convenience of obtaining the push information by the play terminal user.

Figure 3:
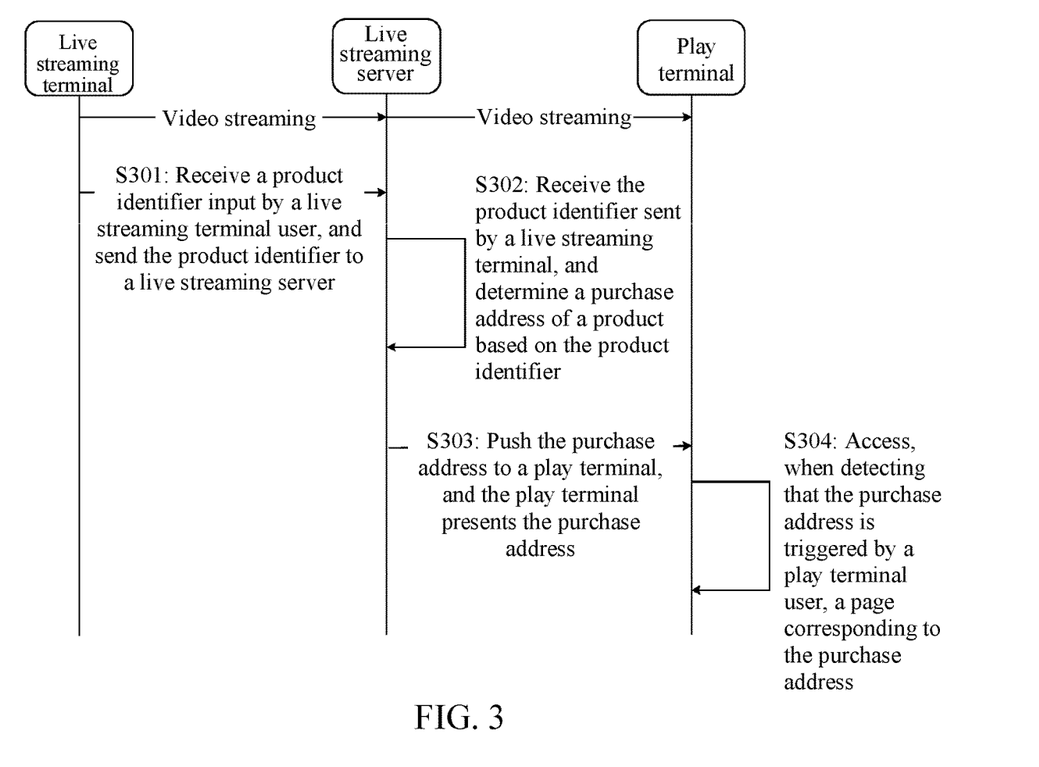
FIG. 3 is a flowchart of another information push method according to an embodiment of this specification.

In addition, in an actual application, the method shown in FIG. 1 may further be used to push product information, as shown in FIG. 3.

FIG. 3 is a flowchart of another information push method according to an embodiment of this specification. The method includes the following steps:

S301: A live streaming terminal receives, in a live streaming process, a product identifier input by a live streaming terminal user; and sends the product identifier to a live streaming server.

S302: The live streaming server receives the product identifier sent by the live streaming terminal, and determines a purchase address of a product based on the product identifier.

S303: The live streaming server pushes the purchase address to a play terminal, and the play terminal presents the purchase address.

S304: The play terminal accesses, when detecting that the purchase address is triggered by a play terminal user, a web page corresponding to the purchase address.

A procedure of the method shown in FIG. 3 is similar to that of the method shown in FIG. 1. Details are not described herein again.

Further, in one embodiment, when a product identifier is stored in a third party server, the third party server may be a server of a third party shopping platform. An association between user identifiers of a same user respectively on two platforms may be pre-established. The association may be that the user identifiers of the two platforms are based on a same mobile number, email address, or the like.

In this way, if the live streaming terminal user has purchased a product on the third party shopping platform, the third party server then keeps a purchase record. When the live streaming terminal user intends to push the product to the play terminal user, the live streaming terminal may download, from the third party server, a product identifier list of products purchased by the live streaming terminal user and present the product identifier list, for the live streaming terminal user to select a product identifier of the product to be pushed by the live streaming terminal user. The product identifier list may be a list of purchase addresses of products purchased by the live streaming terminal user, or may be a list of labels of the products purchased by the live streaming terminal user. In addition, the live streaming terminal user may also input key words in a search box provided by live streaming terminal software, and select a purchase address or a label of the product from the resulted product identifier list.

In another embodiment, the web page corresponding to the purchase address of the product may be a web page of product details, where the play terminal user can view parameter information and a price of the product, and may click to purchase if satisfied. Or the web page may be a payment interface of the product, where the play terminal user can directly pay online to make a purchase.

In one embodiment of this specification, similar to the method show in FIG. 1, a live streaming platform service provider may also use the same method to record an access status of a web page of product details or a payment interface of each product pushed by each anchor. In addition, to more precisely analyze a promotion degree of each anchor for a product, the live streaming platform service provider may further collect statistics about a total number of times the product prompted by each anchor to the play terminal users are finally purchased by play terminal users.

Therefore, a play terminal may detect whether a play terminal user purchases the product. If the play terminal detects that the play terminal user makes a payment by using the accessed web page, the play terminal sends, to a live streaming server, a payment notification including a live streaming terminal user identifier and a purchase address of the product, for the live streaming server to record an association between the live streaming terminal user identifier and the purchase address of the product based on the live streaming terminal user identifier and the purchase address of the product that are included in the payment notification.

Take the example in S104 for instance. After the play terminal user purchases the Novel "FLOWER" pushed by the live streaming terminal user "Nana" and makes a payment, the play terminal notifies the live streaming server. The live streaming server adds one transaction association record of the live streaming terminal user identifier and the push information. For example, the record before this payment is "Nana-Novel "FLOWER-deal 3"", where deal 3 is a number of times of successful historical transactions.

When the live streaming server receives a payment notification, the record is changed as "Nana-Novel "FLOWER-deal 4"".

Further, when the product identifier is stored in the third party server, the live streaming server may further send, to the third party server, an association record and a transaction association record that are stored in the live streaming server and a live streaming platform identifier of the live streaming server, so that the third party server may obtain an association record and an transaction association record that are stored in a live streaming platform.

Figure 4:
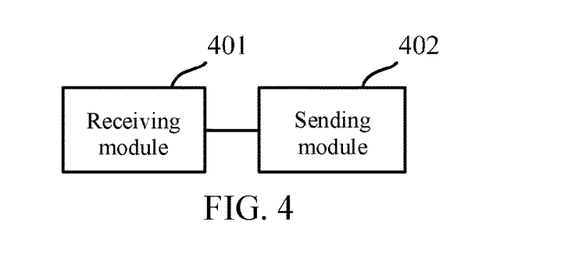
FIG. 4 is a schematic diagram of an information push device according to an embodiment of this specification.

FIG. 4 is a schematic diagram of an information push device according to an embodiment of this specification. The device includes:

a receiving module 401, configured to receive, in a live streaming process, a push information identifier input by a live streaming terminal user; and a sending module 402, configured to send the push information identifier to a live streaming server, for the live streaming server to determine an access address of push information based on the push information identifier, and push the access address to a play terminal for presentation, for the play terminal accesses, when detecting that the access address is triggered by a play terminal user, a web page corresponding to the access address.

The push information identifier includes a label of the push information.

The sending module 402 sends the label of the push information to the live streaming server, for the live streaming server to determine, based on the label, an access address corresponding to the label.

The push information identifier includes the access address of the push information.

The receiving module 401 receives the access address of the push information that is input by the live streaming terminal user; or receives a label of the push information that is input by the live streaming terminal user, sends the label to the live streaming server, receives and presents one or more access addresses that are returned by the live streaming server and that correspond to the label, and determines, as the push information identifier input by the live streaming terminal user, an access address selected by the user from the presented one or more access addresses.

The receiving module 401 receives a push information presentation instruction sent by the live streaming terminal user; obtains and presents, according to the push information presentation instruction, push information identifiers locally pre-stored, stored in the live streaming server, or stored in a third party server; and determines a push information identifier selected by the live streaming terminal user from the presented push information identifiers.

Figure 5:
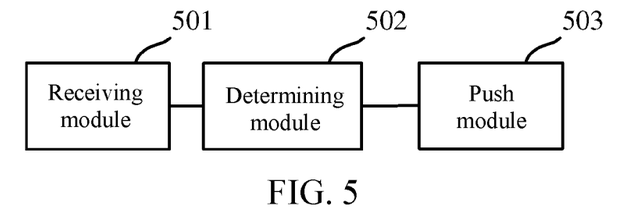
FIG. 5 is a schematic diagram of an information push device according to an embodiment of this specification.

FIG. 5 is a schematic diagram of an information push device according to an embodiment of this specification. The device includes:

a receiving module 501, configured to receive, in a live streaming process, a push information identifier sent by a live streaming terminal;

a determining module 502, configured to determine an access address of push information based on the push information identifier; and a push module 503, configured to push the access address to a play terminal for presentation, for the play terminal to access, when detecting that the access address is triggered by a play terminal user, a web page corresponding to the access address.

The push information identifier includes a label of the push information.

The determining module 502 determines, based on the received label of the push information and a preset correspondence between the labels and access addresses, an access address corresponding to the received label.

The push information identifier includes the access address of the push information.

The device further includes: a selection module 504, configured to: before the receiving module 501 receives the push information identifier sent by the live streaming terminal, receive a label of the push information that is sent by the live streaming terminal; and return one or more access addresses corresponding to the label to the live streaming terminal for presentation.

The receiving module 501 receives, as the received push information identifier, an access address that is sent by the live streaming terminal and that is selected by a live streaming terminal user from the presented one or more access addresses.

The device further includes: an access recording module 505, configured to: when receiving an access notification sent by the play terminal, based on a live streaming terminal user identifier and an access address of the push information that are included in the access notification, record an association between the live streaming terminal user identifier and the access address of the push information, where the access notification is sent when the play terminal detects that the access address is triggered by the play terminal user.

Figure 6:
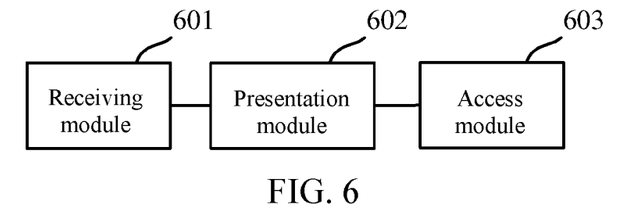
FIG. 6 is a schematic diagram of an information push device according to an embodiment of this specification.

FIG. 6 is a schematic diagram of an information push device according to an embodiment of this specification. The device includes:

a receiving module 601, configured to receive, in a live streaming process, an access address of push information that is sent by a live streaming server;

a presentation module 602, configured to present the received access address; and an access module 603, configured to access, when detecting that the access address is triggered by a play terminal user, a web page corresponding to the access address.

The presentation module 602 establishes, in a play area of a live streaming interface, a view layer independent of a live streaming view layer, and presents the received access address in the view layer.

The device further includes an access notification module 604, configured to: when detecting the access address being triggered by the play terminal user, determine a live streaming terminal user identifier corresponding to the live streaming process, and send, to the live streaming server, an access notification including the live streaming terminal user identifier and the access address of the push information, for the live streaming server to record an association between the live streaming terminal user identifier and the access address of the push information.

Figure 7:
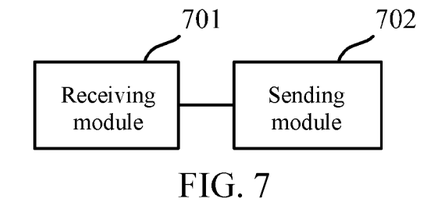
FIG. 7 is a schematic diagram of an information push device according to an embodiment of this specification.

FIG. 7 is a schematic diagram of an information push device according to an embodiment of this specification. The device includes:

a receiving module 701, configured to receive, in a live streaming process, a product identifier input by a live streaming terminal user; and a sending module 702, configured to send the product identifier to a live streaming server, for the live streaming server to determine a purchase address of a product based on the product identifier, and push the purchase address to a play terminal for presentation, for the play terminal to access, when detecting that the purchase address is triggered by a play terminal user, a web page corresponding to the purchase address.

The product identifier includes a label of the product.

The sending module 702 sends the label of the product to the live streaming server, for the live streaming server to determine, based on the label, a purchase address corresponding to the label.

The product identifier includes the purchase address of the product.

The receiving module 701 receives the purchase address of the product that is input by the live streaming terminal user; or receives a label of the product that is input by the live streaming terminal user, sends the label to the live streaming server, receives and presents purchase addresses that are returned by the live streaming server and that correspond to the label, and determines, as the product identifier input by the live streaming terminal user, a purchase address selected by the user from the presented one or more access addresses.

The receiving module 701 receives a product presentation instruction sent by the live streaming terminal user, obtains and presents, according to the product presentation instruction, product identifiers locally pre-stored, stored in the live streaming server, or stored in a third party server, and determines a product identifier selected by the live streaming terminal user from the presented product identifiers.

Figure 8:
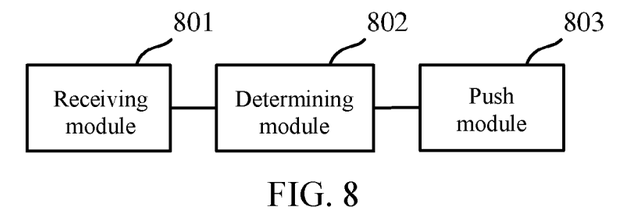
FIG. 8 is a schematic diagram of an information push device according to an embodiment of this specification.

FIG. 8 is a schematic diagram of an information push device according to an embodiment of this specification. The device includes:

a receiving module 801, configured to receive, in a live streaming process, a product identifier sent by a live streaming terminal;

a determining module 802, configured to determine a purchase address of a product based on the product identifier; and a push module 803, configured to push the purchase address to a play terminal for presentation, for the play terminal to access when detecting that the purchase address is triggered by a play terminal user, a web page corresponding to the purchase address.

The product identifier includes a label of the product.

The determining module 802 determines, based on the received label of the product and a preset correspondence between labels and access addresses, a purchase address corresponding to the received label.

The product identifier includes the purchase address of the product.

The device further includes a selection module 804, configured to: before the receiving module 801 receives the product identifier sent by the live streaming terminal, receive a label of the product that is sent by the live streaming terminal; and return purchase addresses corresponding to the label to the live streaming terminal for presentation.

The receiving module 801 receives, as the received product identifier, a purchase address that is sent by the live streaming terminal and that is selected by a live streaming terminal user from the presented purchase addresses.

The device further includes an access recording module 805, configured to: when receiving an access notification sent by the play terminal, based on a live streaming terminal user identifier and a purchase address of the product that are included in the access notification, record an association between on the live streaming terminal user identifier and the purchase address of the product, where the access notification is sent when the play terminal detects that the purchase address is triggered by the play terminal user.

The device further includes a transaction recording module 806, configured to: when receiving a payment notification sent by the play terminal, based on a live streaming terminal user identifier and a purchase address of the product that are included in the payment notification, record a transaction association between the live streaming terminal user identifier and the purchase address of the product, where the payment notification is sent after the play terminal detects that the play terminal user makes a payment.

Figure 9:
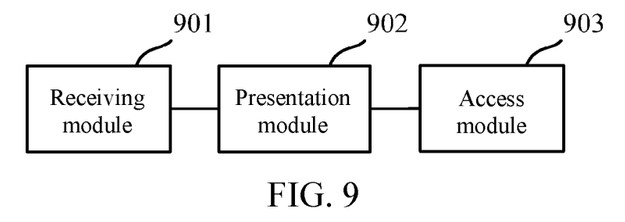
FIG. 9 is a schematic diagram of an information push device according to an embodiment of this specification.

FIG. 9 is a schematic diagram of an information push device according to an embodiment of this specification. The device includes:

a receiving module 901, configured to receive, in a live streaming process, a purchase address of a product that is sent by a live streaming server;

a presentation module 902, configured to present the received purchase address; and an access module 903, configured to access, when detecting that the purchase address is triggered by a play terminal user, a web page corresponding to the purchase address.

The presentation module 902 establishes, in a play area of a live streaming interface, a view layer independent of a live streaming view layer, and presents the received purchase address in the view layer.

The device further includes: an access notification module 904, configured to: when detecting that the purchase address is triggered by the play terminal user, determine a live streaming terminal user identifier corresponding to the live streaming process, and send, to the live streaming server, an access notification including the live streaming terminal user identifier and the purchase address of the product, for the live streaming server to record an association between the live streaming terminal user identifier and the purchase address of the product.

The web page corresponding to the purchase address includes an interface of the recommended product details or a payment web page of the recommended product.

The device further includes a payment notification module 905, configured to: after the access module accesses the web page corresponding to the purchase address and after the play terminal user makes a payment, send, to the live streaming server, a payment notification including a live streaming terminal user identifier and the purchase address of the product, for the live streaming server to record an association between the live streaming terminal user identifier and the purchase address of the product.

A person skilled in the art should understand that the embodiments of the present specification may be provided as a method, a system, or a computer program product. Therefore, the embodiments of the present invention may use a form of total hardware embodiments, total software embodiments, or embodiments combining software and hardware. In addition, the embodiments of the present invention may use a form of a computer program product that is implemented on one or more computer-usable storage media (including but not limited to a disk memory, a compact disc read-only memory (CD-ROM), an optical memory, and the like) that include computer-usable program code.

The embodiments of the present invention are described with reference to the flowcharts and/or block diagrams of the method, the device (system), and the computer program product according to the embodiments of the present invention. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may further be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In typical configuration, a computing device includes one or more processors (e.g., CPU), an input/output interface, a network interface, and a memory.

The memory may include a form such as a volatile memory, a random access memory (RAM), and/or a non-volatile memory in a computer readable medium, for example, a read-only memory (ROM) or a flash memory (e.g., flash RAM). The memory is an example of the computer readable medium.

The computer readable medium includes non-volatile and volatile media, and removable and non-removable media implemented by using any method or technology used for storing information. The information may be a computer readable instruction, a data structure, a program module or other data. An example of a computer storage medium includes, but is not limited to, a phase-change memory (PRAM), a static random access memory (SRAM), a dynamic random access memory (DRAM), another type of RAM, a ROM, an electrically erasable programmable read-only memory (EEPROM), a flash memory or another memory technology, a CD-ROM, a digital versatile disc (DVD) or another optical memory, a cassette, a magnetic tape, a magnetic disk memory or another magnetic storage device, or any other non-transmission medium, and may be used to store information accessible by the computing device. According to the definition in the specification, the computer readable medium does not include transitory computer readable media (transitory media) such as a modulated data signal and a carrier.

It should be further noted that the terms "include", "comprise", or any other variation thereof is intended to cover a non-exclusive inclusion. Therefore, a process, method, product, or device that includes a series of elements not only includes such elements, but also includes other elements not specified expressly, or may include inherent elements of the process, method, product, or device. Without further limitation, the element defined by a phrase "include one . . . " does not exclude other same elements in the process, method, product, or device that include the element.

A person skilled in the art should understand that the embodiments of this application may be provided as a method, a system, or a computer program product. Therefore, this application may use a form of total hardware embodiments, total software embodiments, or embodiments combining software and hardware. In addition, this application may use a form of a computer program product that is implemented on one or more computer-usable storage media (including but not limited to a disk memory, a CD-ROM, an optical memory, and the like) that include computer-usable program code.

The foregoing descriptions are merely embodiments of this application, and are not intended to limit this application. For a person skilled in the art, this application may have various modifications and changes. Any modification, equivalent replacement, improvement, or the like made within the spirit and principle of this application shall fall within the scope of the claims of this application.

What is claimed is:

1. An information pushing method, comprising:
   receiving, by a live streaming server in a live streaming process, a push information presentation instruction from a live streaming terminal;
   determining, by the live streaming server, one or more access addresses of push information based on the push information presentation instruction;
   sending, by the live streaming server, the one or more access addresses of push information to the live streaming terminal for selection;
   receiving, by the live streaming server, a push information identifier from the live streaming terminal, the push information identifier comprising a selected access address from the one or more access addresses of push information;
   determining, by the live streaming server, the selected access address based on the push information identifier; and
   sending, by the live streaming server, the selected access address to a play terminal for the play terminal to present the push information with the selected access address in a view layer independent of a play area of a live streaming interface, wherein the view layer includes a turn-off button configured to turn off the push information, and when detecting that the selected access address is triggered by a play terminal user, the play terminal displays a web page corresponding to the selected access address.

2. The method according to claim 1, wherein determining the selected access address of push information based on the push information identifier comprises:
   determining the selected access address based on a preset correspondence between the push information identifier and the selected access address.

3. The method according to claim 1, before the receiving a push information identifier from the live streaming terminal, the method further comprises:
   receiving a label of the push information from the live streaming terminal; and
   returning one or more access addresses corresponding to the label to the live streaming terminal for selection.

4. The method according to claim 1, wherein the method further comprises:
   when the selected access address is triggered, recording an association between a live streaming terminal user identifier and the selected access address, wherein the live streaming terminal user identifier is for identifying a live streaming terminal user.

5. The method according to claim 1, wherein the push information identifier includes a product identifier, and the selected access address includes a purchase address of the product.

6. The method according to claim 5, further comprises:
receiving, from the play terminal, a payment notification including a live streaming terminal user identifier and the purchase address, wherein the payment notification is received after a payment on the product; and
recording an association between the live streaming terminal user identifier and the purchase address.

7. An information push method, comprising:
receiving, by a live streaming terminal in a live streaming process, a push information presentation instruction input by a live streaming terminal user;
sending, by the live streaming terminal, the push information presentation instruction to a live streaming server to determine one or more access addresses of push information based on the push information presentation instruction;
receiving and presenting, by the live streaming terminal, the one or more access addresses of push information to the live streaming terminal user for selection;
receiving, by the live streaming terminal, a push information identifier input by the live streaming terminal user and comprising a selected access address; and
sending, by the live streaming terminal, the push information identifier to the live streaming server to determine the selected access address of push information based on the push information identifier and send the selected access address to a play terminal for presenting the push information with the selected access address in a view layer independent of a play area of a live streaming interface, wherein the view layer includes a turn-off button configured to turn off the push information, and when detecting that the selected access address is triggered by a play terminal user, the play terminal displays a web page corresponding to the selected access address.

8. The method according to claim 7, wherein
the method further comprises:
receiving a label of the push information; and
sending the label to the live streaming server; and
the receiving and presenting, by the live streaming terminal, the one or more access addresses of push information to the live streaming terminal user for selection, comprises:
receiving and presenting one or more access addresses corresponding to the label from the live streaming server.

9. The method according to claim 7, wherein receiving the push information identifier comprises:
obtaining, according to the push information presentation instruction, one or more pre-stored push information identifiers stored in the live streaming server; and
determining a push information identifier selected by the live streaming terminal user from the one or more push information identifiers as the push information identifier.

10. The method according to claim 7, wherein the push information identifier includes a product identifier, and the selected access address includes a purchase address of the product.

11. An information push method, comprising:
receiving, by a play terminal in a live streaming process, a selected access address of push information from a live streaming server, comprising:
receiving, by the live streaming server in the live streaming process, a push information presentation instruction from a live streaming terminal;
determining, by the live streaming server, one or more access addresses of push information based on the push information presentation instruction;
sending, by the live streaming server, the one or more access addresses of push information to the live streaming terminal for selection;
receiving, by the live streaming server, a push information identifier from the live streaming terminal, the push information identifier comprising a selected access address from the one or more access addresses of push information; and
determining, by the live streaming server, the selected access address based on the push information identifier;
presenting, by the play terminal, the push information and the received selected access address in a view layer independent of a play area of a live streaming interface, wherein the view layer includes a turn-off button configured to turn off the push information; and
accessing a web page corresponding to the push information, when the play terminal detects that the selected access address is triggered.

12. The method according to claim 11, wherein when the selected access address is triggered, the method further comprises:
determining a live streaming terminal user identifier corresponding to the live streaming process; and
sending, to the live streaming server, an access notification including the live streaming terminal user identifier and the selected access address for the live streaming server to record an association between the live streaming terminal user identifier and the selected access address.

13. The method according to claim 11, wherein the selected access address includes a purchase address of a product.

14. The method according to claim 13, wherein the web page includes an interface of the product or a payment page of the product.

15. The method according to claim 13, further comprises:
determining that a payment is made on the web page; and
sending, to the live streaming server, a payment notification including the live streaming terminal user identifier and the purchase address for the live streaming server to record a transaction association between the live streaming terminal user identifier and the purchase address.

* * * * *